A. W. LIVINGSTON.
VEHICLE WHEEL RIM.
APPLICATION FILED APR. 18, 1912.

1,049,378.

Patented Jan. 7, 1913.

WITNESSES:
H. A. Stock
F. P. Schroeder

INVENTOR
ANDREW W. LIVINGSTON
BY
Harry C. Schroeder
ATTORNEY

UNITED STATES PATENT OFFICE.

ANDREW W. LIVINGSTON, OF OAKLAND, CALIFORNIA, ASSIGNOR TO STANDARD STEEL WHEEL AND TIRE ARMOR COMPANY, OF OAKLAND, CALIFORNIA, A CORPORATION OF ARIZONA.

VEHICLE WHEEL-RIM.

1,049,378.   Specification of Letters Patent.   Patented Jan. 7, 1913.

Application filed April 18, 1912. Serial No. 691,714.

*To all whom it may concern:*

Be it known that I, ANDREW W. LIVINGSTON, citizen of the United States, residing at Oakland, in the county of Alameda and State of California, have invented certain new and useful Improvements in Vehicle Wheel-Rims, of which the following is a specification.

This invention relates to vehicle wheels, and the principal object of the same is to provide an improved type of spoke structure which is formed from a circular blank of metal which has its edge portions cut so that when the blank is crimped and the edge portion bent, a rim will be formed by means of which the spoke structure may be connected with the tire of the wheel.

This invention is illustrated in the accompanying drawings, wherein:—

Figure 1:
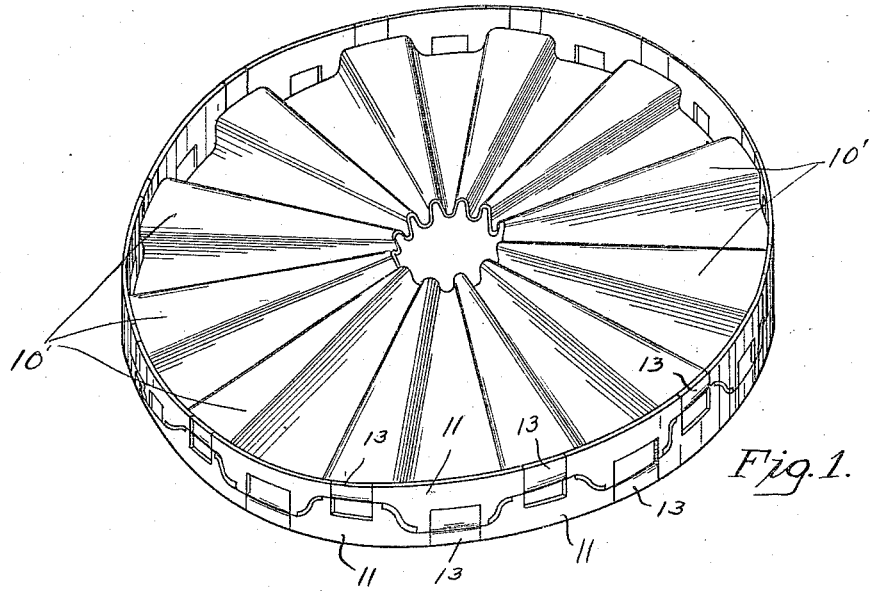
Figure 2:
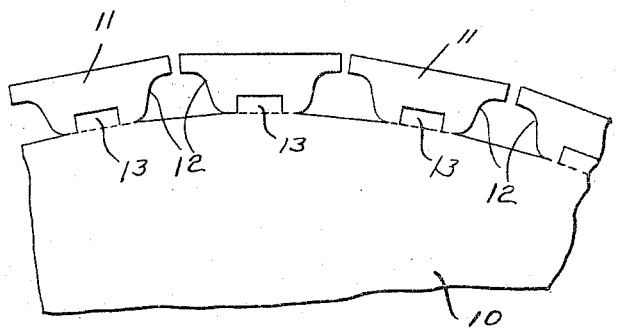
Figure 3:
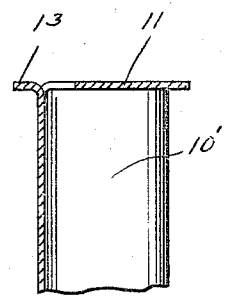
Figure 4:
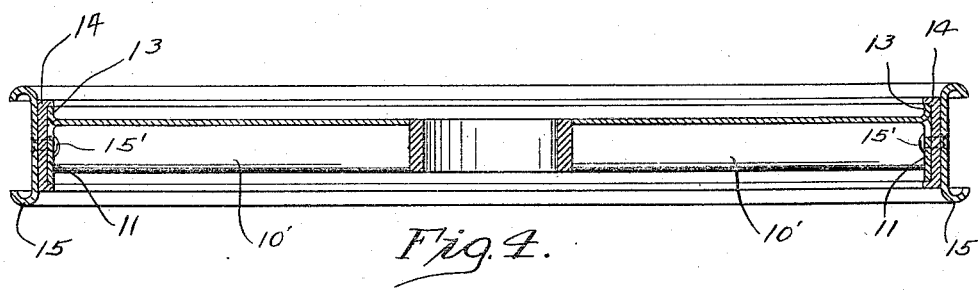

Figure 1 is a perspective view of the spoke structure which is formed in accordance with this invention. Fig. 2 is a fragmentary view of the blank from which the spoke structure is formed. Fig. 3 is a fragmentary sectional view of the spoke structure after being formed. Fig. 4 is a sectional view through a wheel provided with the improved spoke structure.

Referring to the accompanying drawings, it will be seen that this device is formed from a circular blank 10 which has its edge portion cut to form the feet 11. These feet 11 are provided with the curved edges 12 and have the tongues 13 cut from their inner portions so that the feet and tongues may be bent in opposite directions. The blank is crimped as shown in Fig. 1 so as to form the radial corrugations 10", and the tongues and feet are then bent in opposite directions so that the tongues will be positioned between the ends of the feet, and the feet will extend along the sides of the corrugations, thus forming a solid rim as shown in Fig. 1. This spoke structure is placed within the flange felly 14, and the latter is shrunk or rolled into place so that a very strong and durable spoke structure is thus formed. The tire engaging rim 15 is mounted upon the felly 14, and it is secured thereto by means of bolts 15'.

It will thus be seen that there has been provided a spoke structure which may be formed from a single circular blank, and it may be formed with very little loss of metal. The only portion of the metal which is lost being the small pieces which are cut from between the feet 11, and this is necessary in order to leave space so that the edges of the feet may be formed curved, thus conforming to the shape of the corrugations after the spoke structure has been bent to the desired shape as shown in Fig. 1.

Having thus described my invention, what I claim is:—

1. A spoke structure formed from a circular blank having its edge portion cut to form feet provided with curved edges, tongues struck from said feet and adapted to be bent in opposite direction from which the feet are bent, said blank being crimped to form radial corrugations having their edge portions fitting between said feet, and said feet coming in contact with said tongues when said blank is corrugated to form a continuous rim.

2. A spoke structure formed from a circular blank of material having its edge portion cut to form feet having tongues struck therefrom, said feet and tongues being bent in opposite directions, and said blank being crimped to form radial corrugations fitting between said feet, and to bring said feet and tongues into engagement to form a continuous rim for said spoke structure.

3. A spoke structure formed from a blank crimped to form radial corrugations, and feet struck from the edge portion of said blank and bent to engage the edge portion of said corrugations to form a rim for said spoke structure.

In testimony whereof I affix my signature in presence of two witnesses.

ANDREW W. LIVINGSTON.

Witnesses:
W. A. STOCK,
F. P. SCHROEDER.

Copies of this patent may be obtained for five cents each, by addressing the "Commissioner of Patents, Washington, D. C."